United States Patent
Thorat et al.

(10) Patent No.: US 11,277,791 B2
(45) Date of Patent: Mar. 15, 2022

(54) METHOD FOR USER EQUIPMENT INITIATED NETWORK SLICE REGISTRATION AND TRAFFIC FORWARDING IN TELECOMMUNICATION NETWORKS

(71) Applicant: Samsung Electronics Co., Ltd., Suwon-si (KR)

(72) Inventors: Pankaj Bhimrao Thorat, Bangalore (IN); Rajesh Challa, Bangalore (IN); Satya Kumar Vankayala, Bangalore (IN); Vivek Soni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/073,131

(22) Filed: Oct. 16, 2020

(65) Prior Publication Data

US 2021/0120484 A1  Apr. 22, 2021

(30) Foreign Application Priority Data

Oct. 16, 2019 (IN) .............................. 201941041928
Oct. 12, 2020 (IN) .............................. 2019 41041928

(51) Int. Cl.
*H04W 48/18* (2009.01)
*H04W 28/02* (2009.01)
(Continued)

(52) U.S. Cl.
CPC ............. *H04W 48/18* (2013.01); *H04W 8/08* (2013.01); *H04W 28/0268* (2013.01); *H04W 48/16* (2013.01); *H04W 60/00* (2013.01)

(58) Field of Classification Search
CPC ... H04W 48/18; H04W 8/08; H04W 28/0268; H04W 48/16; H04W 60/00; H04W 8/065
See application file for complete search history.

(56) References Cited

U.S. PATENT DOCUMENTS

2019/0313468 A1    10/2019   Talebi Fard et al.
2020/0137675 A1*   4/2020    Park ...................... H04W 60/00
(Continued)

FOREIGN PATENT DOCUMENTS

| CA | 3026841 A1 | 6/2019 |
| CN | 110022581 A | 7/2019 |
| CN | 110049519 A | 7/2019 |

OTHER PUBLICATIONS

3GPP TS 23.501 V15.3.0 (Sep. 2018), Technical Specification, 3rd Generation Partnership Project; Technical Specification Group Services and System Aspects; System Architecture for the 5G System; Stage 2 (Release 15), 226 pages.
(Continued)

*Primary Examiner* — Julio R Perez

(57) ABSTRACT

The present disclosure relates to method and system for user equipment (UE)-initiated network slice registration and traffic forwarding in telecommunication networks. In an embodiment, for network slice registration, UE transmits a registration request to an AMF via a base station of telecommunication network. In response to the registration request, the AMF transmits a registration accept response comprising network slice selection assistance information (NSSAI) to the UE. For traffic forwarding, the UE transmits a PDU session establishment request comprising single NSSAI to the telecommunication network. The base station of the telecommunication network maps the single NSSAI to a Flow Label field of IPv6 header and transmits to DPAF via specific SLF of the telecommunication network. DPAF compares QoS transport characteristics of the single NSSAI with QoS transport characteristics of the NSSAI in the DPAF of the telecommunication network and transmits a PDU session establishment response to the UE based on comparison.

20 Claims, 9 Drawing Sheets

(51) Int. Cl.
      *H04W 48/16*     (2009.01)
      *H04W 8/08*      (2009.01)
      *H04W 60/00*     (2009.01)

(56) References Cited

U.S. PATENT DOCUMENTS

| | | | |
|---|---|---|---|
| 2020/0195495 A1* | 6/2020 | Parker | H04M 15/8038 |
| 2020/0336960 A1* | 10/2020 | Park | H04W 36/023 |
| 2021/0037426 A1* | 2/2021 | Zhu | H04W 28/16 |
| 2021/0076252 A1* | 3/2021 | Wei | H04L 12/14 |
| 2021/0329464 A1* | 10/2021 | Xing | H04W 72/087 |

OTHER PUBLICATIONS

"3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 V16.1.0 (Sep. 2019), 78 pages.

"3rd Generation Partnership Project; Technical Specification Group Services and System Aspects; Procedures for the 5G System (5GS); Stage 2 (Release 16)", 3GPP TS 23.502 V16.2.0 (Sep. 2019), 524 pages.

"3rd Generation Partnership Project; Technical Specification Group Services and System Aspects; System Architecture for the 5G System (5GS); Stage 2 (Release 16)", 3GPP TS 23.501 V16.2.0 (Sep. 2019), 389 pages.

International Search Report dated Jan. 26, 2021 in connection with International Patent Application No. PCT/KR2020/014177, 3 pages.

Written Opinion of the International Searching Authority dated Jan. 26, 2021 in connection with International Patent Application No. PCT/KR2020/014177, 4 pages.

Examination report dated Dec. 2, 2021, in connection with Indian Application No. 201941041928, 7 pages.

\* cited by examiner

METHOD FOR USER EQUIPMENT INITIATED NETWORK SLICE REGISTRATION AND TRAFFIC FORWARDING IN TELECOMMUNICATION NETWORKS

CROSS REFERENCE TO RELATED APPLICATIONS

This application is based on and claims priority under 35 U.S.C. § 119(a) to Indian Provisional Patent Application Serial No. 201941041923 (PS), filed on Oct. 16, 2019, in the Indian Intellectual Property Office, and to Indian Complete Patent Application Serial No. 201941041923 (CS), filed on Oct. 12, 2020, in the Indian Intellectual Property Office, the disclosures of which are incorporated herein by reference in their entireties.

BACKGROUND

1. Field

The present disclosure generally relates to wireless communications. Particularly, but not exclusively, certain embodiments relate to method and system for user equipment (UE)-initiated network slice registration and traffic forwarding in telecommunication networks.

2. Description of Related Art

Network slicing is a type of virtual networking architecture in the same family as that of software-defined networking (SDN) and network functions virtualization (NFV). SDN and NFV allow network flexibility through the partitioning of 5G network architectures into virtual elements. In essence, network slicing allows the creation of multiple virtual networks on top of a shared physical infrastructure. In cloud virtual random access network (VRAN) scenario, physical components are secondary and logical (software-based) partitions are paramount, devoting capacity to certain purposes dynamically, according to need. Using some common resources such as storage and processors, network slicing permits the creation of network slices devoted to logical, self-contained and partitioned network functions.

There exist problems in facilitating network slice-specific traffic treatment in terms of classifying and rerouting the incoming traffic to its destined network slice. For classifying slice-specific traffic, packet marking is one of the commonly suggested approaches such as segment routing over IPv6 data plane (SRv6), encoding slice identifier (ID) in the header field, virtual LAN (VLAN), network service header (NSH) and multiprotocol label switching (MPLS). However, these approaches suffer from the effects of additional header such as higher packet overhead leading to reduced payload, increased traffic volume, higher processing delay (header parsing), increased end-2-end latency and incompatibility (like NSH may not be supported by all network elements).

Furthermore, with reference to 3GPP TS 23.501, radio access network (RAN) maps and encodes differentiated services code point (DSCP) field of packet based on QoS flow identifier (QFI) and allocation and retention priority (ARP) of the associated QoS Flow. DSCP is 6 bits code point that allows maximum 26 (i.e. 64) different codes. As per TS 23.501 (Rel. 16), there are 86 5QIs (Quality of Service (QoS) Codes) and no one-to-one DSCP:5QI mapping. As a result, DSCP field cannot map the growing number of 5QIs (5QI grows with each 3GPP release). As 5G network slice is meant to enable differentiation of various services with diverse QoS requirements, the current DSCP field in the packet is not sufficient to identify/classify and forward the traffic flow to its destined network slice.

The information disclosed in this background of the disclosure section is for enhancement of understanding of the general background of the present disclosure and should not be taken as an acknowledgement or any form of suggestion that this information forms the prior art already known to a person skilled in the art.

SUMMARY

The disclosure is provided to address at least the above-mentioned problems and/or disadvantages and to provide at least the advantages described below.

In accordance with an aspect of the disclosure, in an embodiment, the present disclosure may relate to a method for traffic forwarding in telecommunication networks performed by a user equipment (UE) is provided. The method may comprise: transmitting a protocol data unit (PDU) session establishment request to a telecommunication network, wherein the PDU session establishment request comprises a single network slice selection assistance information (NSSAI), QoS indicator and address resolution protocol (ARP), receiving a PDU session establishment response from the telecommunication network for establishing data flow using the single NSSAI when QoS transport characteristics associated with the single NSSAI sent by the UE matches with one of QoS transport characteristics of the NSSAI of the telecommunication network, and receiving a PDU session establishment response from the telecommunication network for establishing data flow using a new NSSAI when the QoS transport characteristics associated with the single NSSAI sent by the UE do not match with one of the QoS transport characteristics of the NSSAI of the telecommunication network.

In accordance with another aspect of the disclosure, a method for traffic forwarding in telecommunication networks performed by a system is provided. The method may comprise: receiving, by base station of a telecommunication network, a PDU session establishment request from a user equipment (UE), wherein the PDU session establishment request comprises a single network slice selection assistance information (NSSAI), QoS indicator and address resolution protocol (ARP), mapping, by base station of the telecommunication network, the single NSSAI to a Flow Label field of IPv6 header based QoS indicator and ARP, transmitting, by the base station of the telecommunication network, the PDU session establishment request along with the Flow Label field to a specific slice link function (SLF) using a session management function (SMF) via an access and mobility function (AMF) of the telecommunication network, transmitting, by the SLF of the telecommunication network, the single NSSAI of the PDU session establishment request to a data plane application function (DPAF) of the telecommunication network, converting, by the DPAF of the telecommunication network, network slice information of the single NSSAI of the PDU session establishment request into QoS transport characteristics, comparing, by the DPAF of the telecommunication network, the QoS transport characteristics of the single NSSAI with QoS transport characteristics of the NSSAI in the DPAF of the telecommunication network, transmitting, by the DPAF of the telecommunication network, a PDU session establishment response via the SMF and the AMF of the telecommunication network for establishing data flow using the single NSSAI when the QoS transport characteristics of single NSSAI sent by the UE matches with the QoS transport characteristics of the NSSAI of the telecommunication network.

In accordance with another aspect of the disclosure, a user equipment (UE) for traffic forwarding in telecommunication networks may comprise a processor and a memory communicatively coupled to the processor, wherein the memory stores processor-executable instructions, which on execution, cause the processor to: transmit a protocol data unit (PDU) session establishment request to a telecommunication network, wherein the PDU session establishment request comprises a single network slice selection assistance information (NSSAI), QoS indicator and address resolution protocol (ARP), receive a PDU session establishment response from the telecommunication network for establishing data flow using the single NSSAI when QoS transport characteristics associated with the single NSSAI sent by the UE matches with one of QoS transport characteristics of the NSSAI of the telecommunication network, and receive a PDU session establishment response from the telecommunication network for establishing data flow using a new NSSAI when the QoS transport characteristics associated with the single NSSAI sent by the UE do not match with one of the QoS transport characteristics of the NSSAI of the telecommunication network.

In accordance with another aspect of the disclosure, a system for traffic forwarding in telecommunication networks may comprise: a base station configured to receive a PDU session establishment request from a user equipment (UE), wherein the PDU session establishment request comprises a single network slice selection assistance information (NSSAI), QoS indicator and address resolution protocol (ARP), map the single NSSAI to a Flow Label field of IPv6 header based QoS indicator and ARP and transmit the PDU session establishment request along with the Flow Label field to a specific slice link function (SLF) using a session management function (SMF) via an access and mobility function (AMF) of a telecommunication network, the SLF configured to: transmit the single NSSAI of the PDU session establishment request to a data plane application function (DPAF) of the telecommunication network, the DPAF configured to convert network slice information of the single NSSAI of the PDU session establishment request into QoS transport characteristics, compare the QoS transport characteristics of the single NSSAI with QoS transport characteristics of the NSSAI in the DPAF of the telecommunication network, transmit a PDU session establishment response via the SMF and the AMF of the telecommunication network for establishing data flow using the single NSSAI when the QoS transport characteristics of single NSSAI sent by the UE matches with the QoS transport characteristics of the NSSAI of the telecommunication network.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
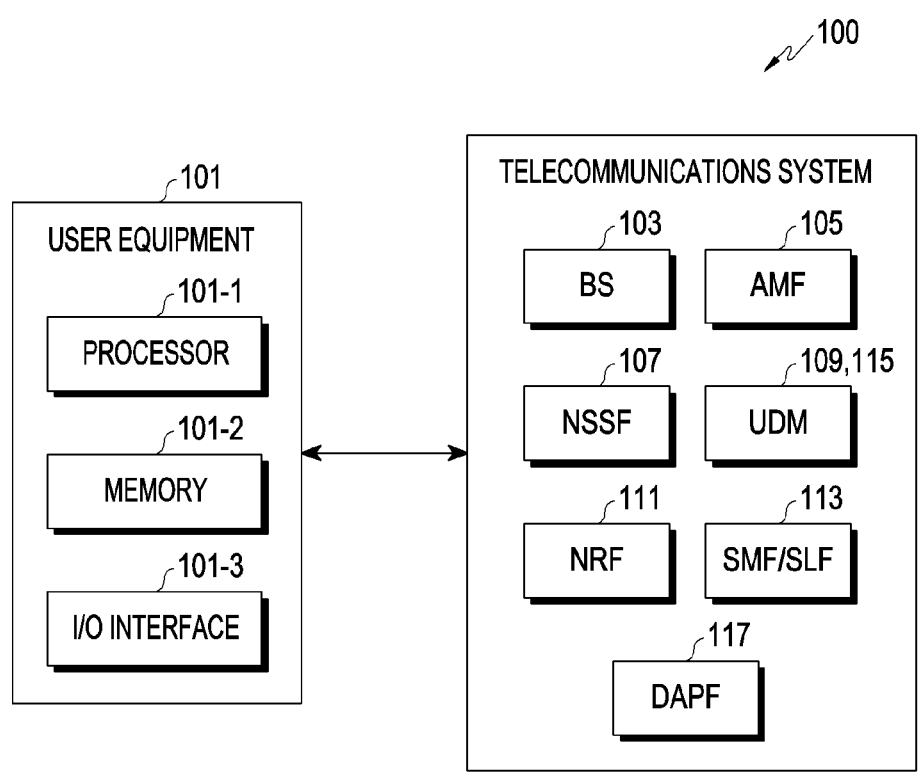
FIG. 1 illustrates an exemplary environment for UE-initiated network slice registration and traffic forwarding in telecommunication networks in accordance with an embodiment.

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings. Although specific embodiments are illustrated in the drawings and described in detail with reference thereto, this is not to limit the embodiments to specific forms.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however that the specific embodiments are not intended to limit the disclosure to examples that are disclosed. On the contrary, the disclosure is to cover modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include those components or steps only, but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and the drawings are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure can be in general be applied to telecommunication technologies including 4G, 5G, and 6G.

The present disclosure may comprise of two parts: (1) UE-initiated network slice registration followed by (2) traffic forwarding in telecommunication networks. FIG. 1 illustrates an exemplary environment for UE-initiated network slice registration and traffic forwarding in telecommunication networks in accordance with an embodiment.

Referring to FIG. 1, the environment 100 may include a UE 101 and a telecommunication system. The UE 101 may be any electronic device such as, but not limited to, smartphone, capable of utilizing telecommunication communication technology. The UE 101 may include central processing unit ("CPU" or "processor" or "controller") (101-1) and a memory (101-2) storing instructions executable by the processor (101-1). The processor (101-1) may include at least one data processor for executing program components for executing user or system-generated requests. The memory (101-2) may be communicatively coupled to the processor (101-1). The UE (101) further includes an Input/Output (I/O) interface (101-3). The I/O interface (101-3) may be coupled with the processor (101-1) through which an input signal or/and an output signal may be communicated. The telecommunication network of the present disclosure may be referred as a system or a telecommunication system comprising, but not limited to, a base station (BS) 103, an access and mobility function (AMF) 105, a network slice selection function (NSSF) 107, an unified data management (UDM) 109, 115, an network repository function (NRF) 111 and a session management function/slice link function (SMF/SLF) 113. For instance, in 5G telecommunication network, the base station 103 may be gNodeB (gNB). The AMF 105 may oversee authentication, connection, and mobility management between the telecommunication network and the UE 101. The AMF 105 may receive connection and session related information from the UE 101. The SMF 113 may handle session management, IP address allocation, and control of policy enforcement. The NSSF 107 may select network slice instance (NSI) based on information provided during UE attach. A set of AMFs may be provided to the UE 101 based on which slices the UE 101 has access to. The UDM 109 may manage network user data in a single, centralized element. The NRF 111 may maintain a record of available network function (NF) instances and their supported services. The NRF 111 may allow other NF instances to subscribe and be notified of registrations from NF instances of a given type. The NRF 111 may support service discovery, by receipt of Discovery Requests from NF instances and details which NF instances support specific services. In addition to the above-mentioned telecommunication network elements/components, the system may comprise one or more SLF 113 and a DPAF 117. The SLF 113 may be a part of SMF 113 or a separate network element. The one or more SLF 113 may be responsible to communicate transport subslice related NSSAI information with the DPAF 117 in data plane (i.e. data center, where transport slice subslices reside). The DPAF 117 may open RE presentational state transfer (REST) based services which may be discovered by the SLF 113 before initiating communication. For the network slice registration, UE 101 may transmit a registration request to the AMF 105 via the base station 103 of telecommunication network. In response to the registration request, the AMF 105 transmits a registration accept response comprising NSSAI to the UE 101. For traffic forwarding, the UE 101 transmits a PDU session establishment request comprising single NSSAI to the telecommunication network. The base station 103 of the telecommunication network maps the single NSSAI to a Flow Label field of IPv6 header and transmits to the DPAF 117 via the specific SLF 113 of the telecommunication network. The DPAF 117 compares QoS transport characteristics of the single NSSAI with QoS transport characteristics of the NSSAI in the DPAF 117 of the telecommunication network and transmits a PDU session establishment response to the UE 101 based on comparison.

Figure 2:
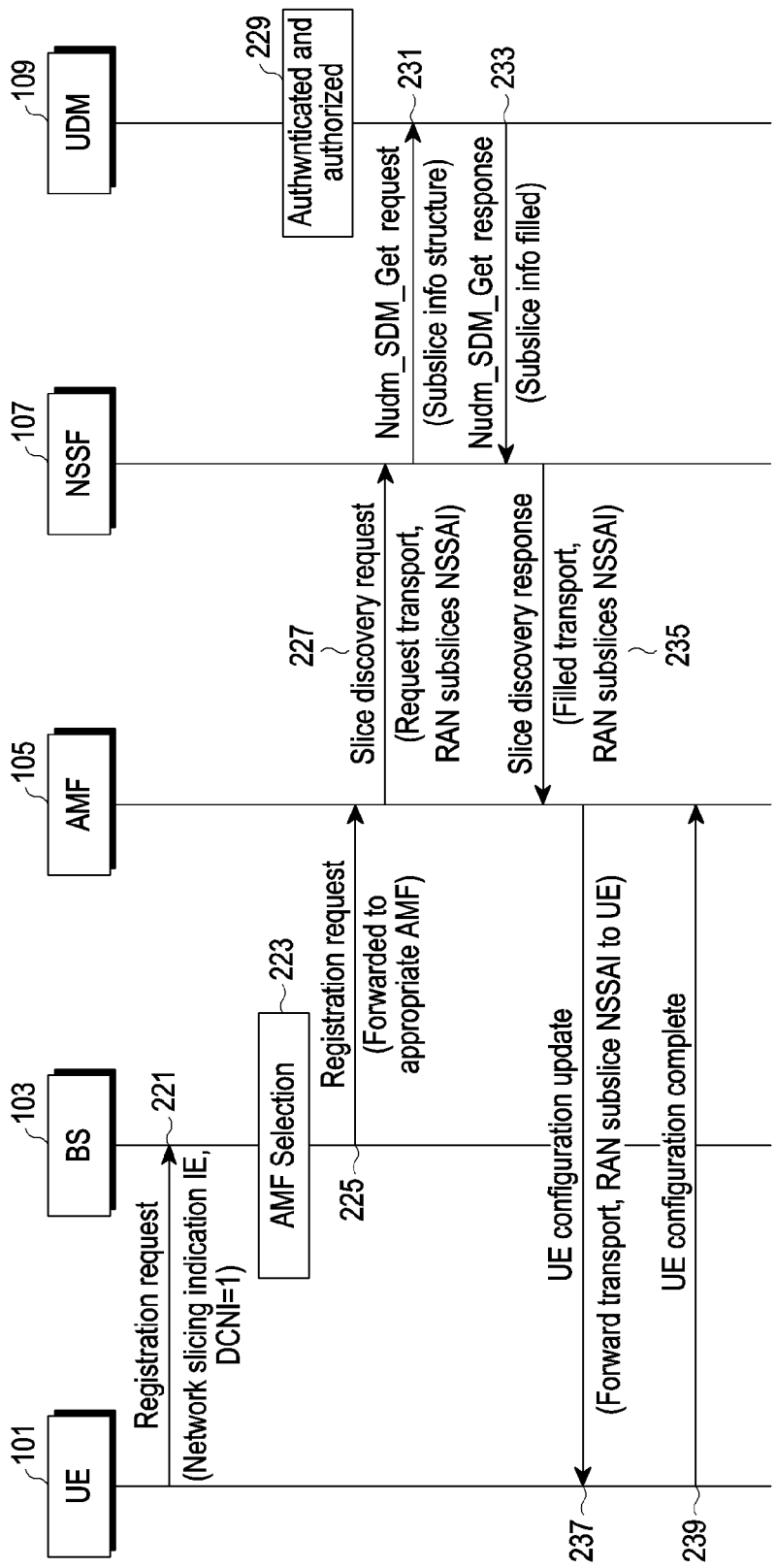
FIG. 2 shows exemplary sequence diagram illustrating a method for UE-initiated network slice registration in accordance with an embodiment.

FIG. 2 shows exemplary sequence diagram illustrating a method for UE-initiated network slice registration in accordance with some embodiments of the present disclosure.

Referring to FIG. 2, at step 221, the UE 101 may transmit a registration request to the base station 103. The registration request may comprise at least one of default configured network slice selection assistance information (DCNI) and network slicing indication information element (IE). At step 223, the base station 103 may select the AMF 105 based on at least one of DCNI and network slicing indication IE. In one embodiment, the base station 103 may select a default AMF node/element. At step 225, the base station 103 may forward/transmit the registration request from the UE 101 to the selected AMF 105 or the default AMF. At step 227, the selected AMF 105 or the default AMF may transmit a slice discovery request to the NSSF 107 of the telecommunication network in response to the registration request. The slice discovery request may comprise request for transport subslice related NSSAI information. At step 229, the UDM 109 may be authenticated and authorized prior to receiving a request from the NSSF 107. At step 231, the NSSF 107 may transmit a Nudm_SDM_Get request for requesting information on subslices to the UDM 109. At step 233, in response to the Nudm_SDM_Get request, the UDM 109 may transmit a Nudm_SDM_Get response with requested information on subslices to the NSSF 107. At step 235, the NSSF 107 may transmit a slice discovery response to the AMF 105 of the telecommunication network. The slice discovery response may comprise requested transport subslice related NSSAI information. Here, the requested transport subslice related NSSAI information may, also, be referred as NSSAI. The NSSAI may comprise a plurality of single NSSAI, typically, up to eight (8) single NSSAI in the NSSAI. At step 237, the AMF 105 of the telecommunication network may transmit a registration accept response to the UE 101. The registration accept response may, also, be referred as a UE configuration update. The registration accept response may comprise (forward) transport subslice related NSSAI information. At step 239, in response to the received registration accept response from the AMF 105, the UE 101 may transmit a UE configuration complete or network slice registration complete. The steps 221 to 239 refer to UE-initiated network slice registration process.

Figure 3:
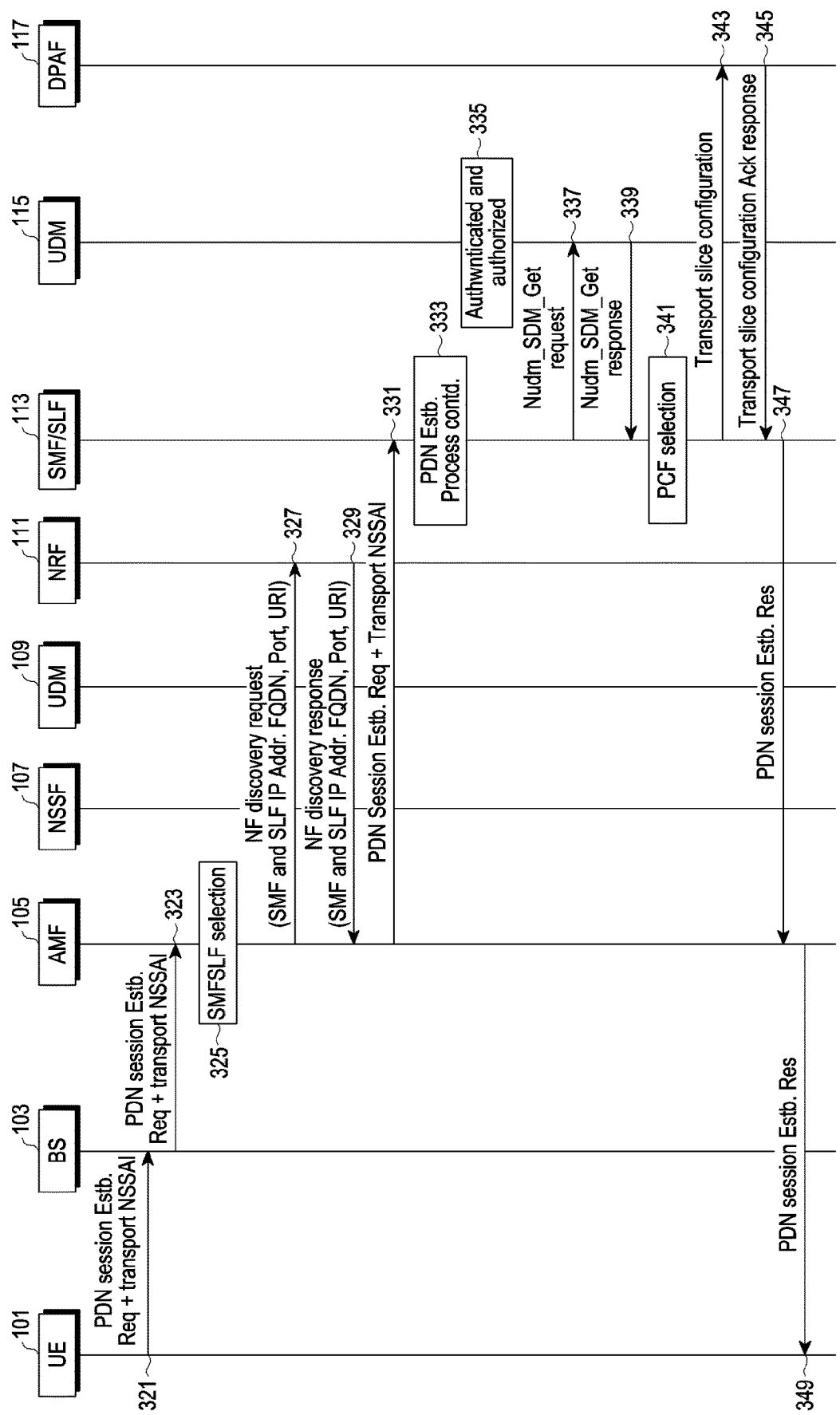
FIG. 3 shows exemplary sequence diagram illustrating a method for traffic forwarding in telecommunication networks in accordance with an embodiment.

FIG. 3 shows exemplary sequence diagram illustrating a method for traffic forwarding in telecommunication networks in accordance with some embodiments of the present disclosure.

Referring to FIG. 3, at step 321, the UE 101 may transmit a PDU session establishment request to the base station 103 (for each IP flow in a network slice). The PDU session establishment request may comprise at least one of a single NSSAI, QoS indicator and ARP. The QoS indicator may be QFI or 5QI for 5G telecommunication network. In one embodiment, the single NSSAI may comprise at least one of slice/service type (SST) and slice differentiator (SD). The information contained in the at least one of SST and SD may be referred as network slice information. The SST may refer to expected network slice behavior in terms of features and services. The SD may be an optional information that complements the SST to differentiate amongst multiple network slices of the same SST. The SD may comprise at least one of subslice identifier and non-standard value. The SD may differentiate network slices with same SST—24 bits. Standardized single NSSAI may have only SST and no SD. Non-standard single NSSAI may be defined as either SST alone (i.e. non-standard) or SST along with SD. At step 323, the base station 103 may, first, map the single NSSAI to a Flow Label field of IPv6 header based on QoS indicator and ARP. The Flow Label field of IPv6 header is a 20 bits field that allows mapping up to $2^{20}$ (i.e. 1048576) network slices. The Flow Label field may allow mapping of packet flows to its network slice based on its QoS transport characteristics i.e. the Flow Label field may be used to classify and forward the (packet) traffic on its respective network slice. In one embodiment, the base station 103 may select the AMF 105 based on at least one of the single NSSAI, QoS indicator and ARP. In another embodiment, the base station 103 may select a default AMF node/element. Subsequently, the base station 103 may transmit the PDU session establishment request along with the Flow Label field to the AMF 105 based on selection. At step 325, the AMF 105 may perform selection of the SMF 113. At step 327, the AMF 105 may transmit NF discovery request to the NRF 111. The NF discovery request may comprise requesting information on at least one of SMF and SLF IP address, fully qualified domain name (FQDN), port number and uniform resource identifier (URI). At step 329, in response to the request, the NRF 111 may transmit NF discovery response to the AMF 105. The NF discovery response may comprise requested information on at least one of the SMF and SLF IP address, FQDN, port number and URI. At step 331, the AMF 105 may transmit the PDU session establishment request to the SMF 113. At step 333, the SMF 113 may select a specific SLF 113 based on the Flow Label field received in the PDU session establishment request. In one embodiment, the SLF 113 may be a part of the SMF 113. In another embodiment, the SLF 113 may be a separate or independent network element and is communicably connected to the SMF 113. At step 335, the UDM 115 may be authenticated and authorized prior to receiving a request from the SMF/SLF 113. The UDM 115 may manage data for access authorization, user registration, and data network profiles. Subscriber data may be provided to the SMF 113, which allocates IP addresses and manages user sessions on the telecommunication network. Depending on the construction of the telecommunication network, both UDM software and unified data repository (UDR) may send and store data. In a stateless network, user information may be stored in the UDR, but the UDM function may retrieve the data, send it to other network functions and manage it. The UDM 115 may do this with many UDRs. At step 337, the SMF/SLF 113 may transmit a Nudm_SDM_Get request for requesting/retrieving information on user subscription (for services) to the UDM 115. Nudm is related to the 3GPP telecommunication Architecture. It identifies a Service-based Interface for the Unified Data Management. The Nudm_SDM_Get service may use the Nudm_SDM application programming interface (API). The initial AMF may request UE's Slice Selection Subscription data from the UDM 115 by invoking the Nudm_SDM_Get service operation. Consumer NF gets the subscriber data indicated by the subscription data type input from the UDM 115. The UDM 115 may check the requested consumer is authorized to get the specific subscription data requested. In case of NF consumer is SMF, the subscriber data may contain, for example, Allowed PDU Session Type(s), Allowed SSC mode(s), and default 5QI/ARP. At step 339, in response to the Nudm_SDM_Get request, the UDM 115 may transmit a Nudm_SDM_Get response with requested/retrieved information on the user subscription (for services) to the SMF/SLF 113. At step 341, the SMF/SLF 113 may select policy control function (PCF) based on the information on the user subscription (for services). In one embodiment, the SMF 113 may transmit the PDU session establishment request along with the Flow Label field to the SLF 113. At step 343, the SLF 113 of the SMF/SLF 113 may transmit transport slice configuration to the DPAF 117. The SLF 113 may communicate with the DPAF 117 in data plane. The DPAF 117 may be a part of provider edge (PE) or customer edge (CE). The transport slice configuration may comprise the single NSSAI of the PDU session establishment request. On receiving the transport slice configuration, the DPAF 117 may convert network slice information (i.e. the information contained in the at least one of SST and SD) of the single NSSAI of the PDU session establishment request into QoS transport characteristics such as data rate, jitter, priority and the like and subsequently, may compare the QoS transport characteristics of the single NSSAI with QoS transport characteristics of the NSSAI in the DPAF 117. At step 345, the DPAF 117 may transmit a PDU session establishment response to the SMF/SLF 113 for establishing data flow using the single NSSAI when the QoS transport characteristics of single NSSAI sent by the UE 101 matches with the QoS transport characteristics of the NSSAI of the telecommunication network. Alternatively, the DPAF 117 may transmit the PDU session establishment response to the SMF/SLF 113 for establishing data flow using new NSSAI when the QoS transport characteristics of the single NSSAI sent by the UE 101 do not match with the QoS transport characteristics of the NSSAI of the telecommunication network. The PDU session establishment response may, also, referred as transport slice configuration Ack response. In one embodiment, the new NSSAI has QoS transport characteristics similar to the single NSSAI. At step 347, the SMF/SLF 113 may forward/transmit the PDU session establishment response to the AMF 105 at step 347. At Step 349, the AMF 105 may transmit/forward the PDU session establishment response to the UE 101. The steps 321 to 349 refer to traffic forwarding process in telecommunication networks.

Figure 4:
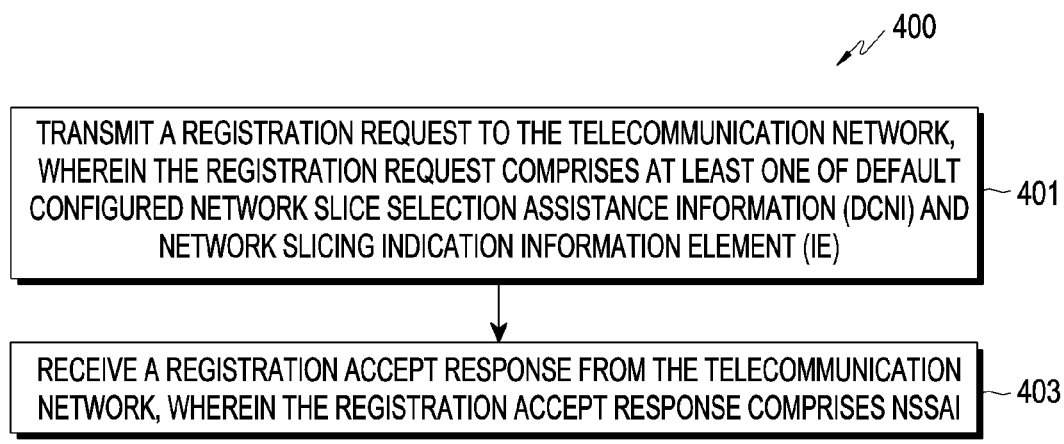
FIG. 4 illustrates a flowchart showing a method for UE-initiated network slice registration performed by a UE in accordance with an embodiment.

FIG. 4 illustrates a flowchart showing a method for UE-initiated network slice registration performed by a UE in accordance with some embodiments of the present disclosure.

As illustrated in the FIG. 4, the method 400 includes one or more steps for UE-initiated network slice registration. The method 400 may be described in the general context of computer executable instructions. Generally, computer executable instructions can include routines, programs, objects, components, data structures, procedures, units, and functions, which perform particular functions or implement particular abstract data types.

The order in which the method 400 is described is not intended to be construed as a limitation, and any number of the described method steps can be combined in any order to implement the method. Additionally or alternatively, individual steps may be deleted from the methods without departing from the scope of the subject matter described herein. Furthermore, the method can be implemented in any suitable hardware, software, firmware, or combination thereof.

Referring to FIG. 4, at step 401, the UE 101 may transmit a registration request to the telecommunication network. The registration request may comprise at least one of DCNI and network slicing indication IE.

At step 403, the UE 101 may receive a registration accept response from the telecommunication network. The registration accept response may comprise NSSAI.

Figure 5:
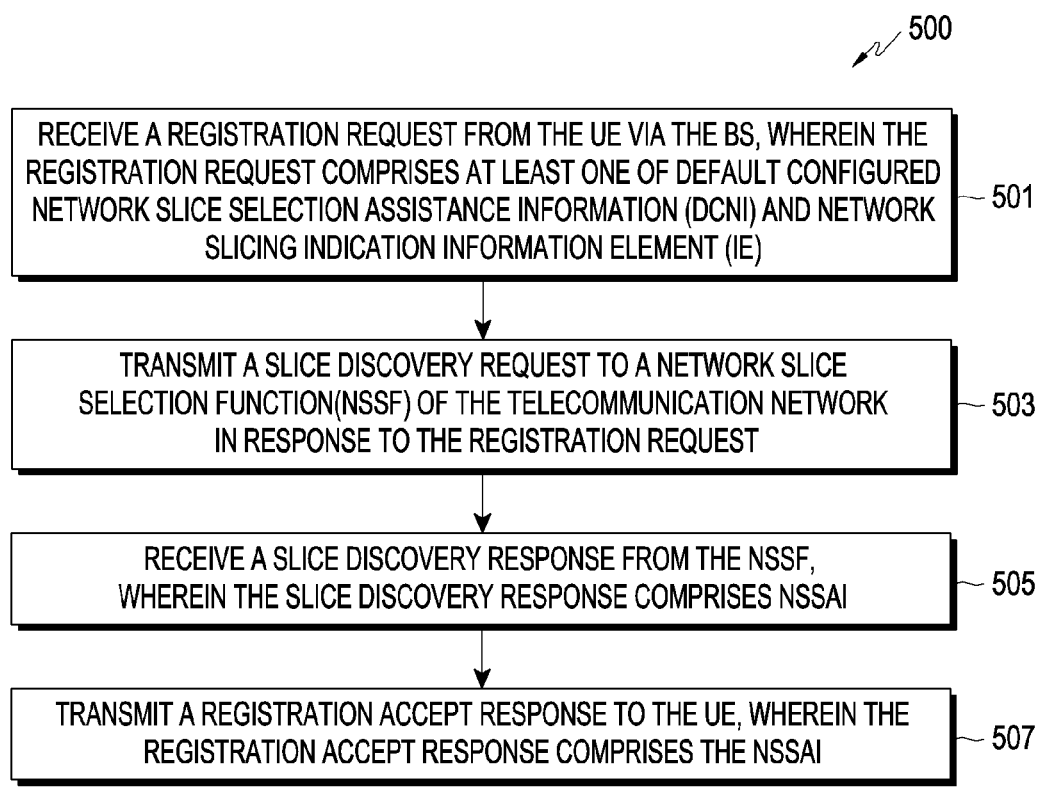
FIG. 5 illustrates a flowchart showing a method for UE-initiated network slice registration performed by a system in accordance with an embodiment.

FIG. 5 illustrates a flowchart showing a method for UE-initiated network slice registration performed by a system in accordance with some embodiments of the present disclosure.

As illustrated in the FIG. 5, the method 500 includes one or more steps for UE-initiated network slice registration. The method 500 may be described in the general context of computer executable instructions. Generally, computer executable instructions can include routines, programs, objects, components, data structures, procedures, units, and functions, which perform particular functions or implement particular abstract data types.

The order in which the method 500 is described is not intended to be construed as a limitation, and any number of the described method steps can be combined in any order to implement the method. Additionally, or alternatively, individual steps may be deleted from the methods without departing from the scope of the subject matter described herein. Furthermore, the method can be implemented in any suitable hardware, software, firmware, or combination thereof.

Referring to FIG. 5, at step 501, the AMF 105 of the telecommunication network may receive a registration request from the UE 101 via the BS 103. The registration request may comprise at least one of DCNI and network slicing indication IE.

At step 503, the AMF 105 of the telecommunication network may transmit a slice discovery request to the NSSF 107 of the telecommunication network in response to the registration request from the UE 101.

At step 505, the AMF 105 of the telecommunication network may receive a slice discovery response from the NSSF 107. The slice discovery response may comprise NSSAI.

At step 507, the AMF 105 of the telecommunication network may transmit a registration accept response to the UE 101. The registration accept response may comprise the NSSAI.

Figure 6:
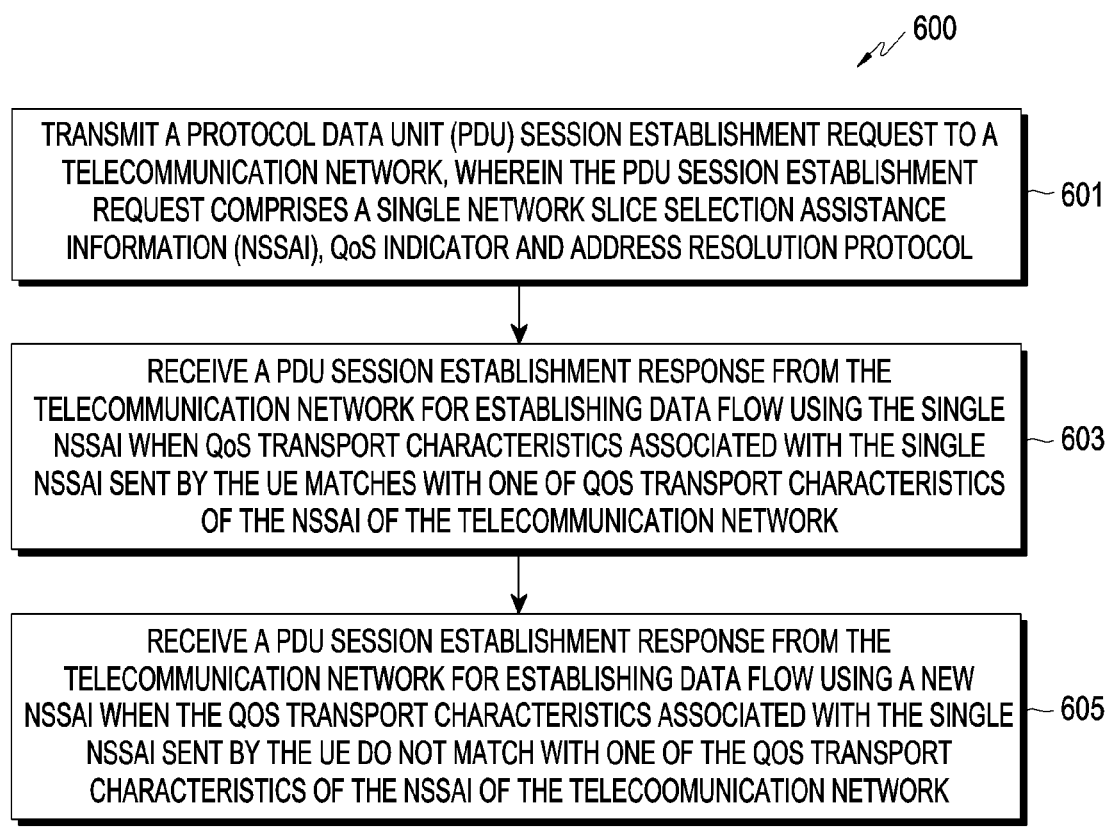
FIG. 6 illustrates a flowchart showing a method for traffic forwarding in telecommunication networks performed by a UE in accordance with an embodiment.

FIG. 6 illustrates a flowchart showing a method for traffic forwarding in telecommunication networks performed by a UE in accordance with some embodiments of the present disclosure.

As illustrated in the FIG. 6, the method 600 includes one or more steps for traffic forwarding in telecommunication networks. The method 600 may be described in the general context of computer executable instructions. Generally, computer executable instructions can include routines, programs, objects, components, data structures, procedures, units, and functions, which perform particular functions or implement particular abstract data types.

The order in which the method 600 is described is not intended to be construed as a limitation, and any number of the described method steps can be combined in any order to implement the method. Additionally or alternatively, individual steps may be deleted from the methods without departing from the scope of the subject matter described herein. Furthermore, the method can be implemented in any suitable hardware, software, firmware, or combination thereof.

Referring to FIG. 6, at step 601, the UE 101 may transmit a PDU session establishment request to the telecommunication network. The PDU session establishment request may comprise a single NSSAI, QoS indicator and ARP.

At step 603, the UE 101 may receive a PDU session establishment response from the telecommunication network for establishing data flow using the single NSSAI. This may happen when QoS transport characteristics associated with the single NSSAI sent by the UE 101 matches with one of QoS transport characteristics of the NSSAI of the telecommunication network.

At step 605, the UE 101 may receive a PDU session establishment response from the telecommunication network for establishing data flow using a new NSSAI. This may happen when the QoS transport characteristics associated with the single NSSAI sent by the UE 101 do not match with one of the QoS transport characteristics of the NSSAI of the telecommunication network.

Figure 7:
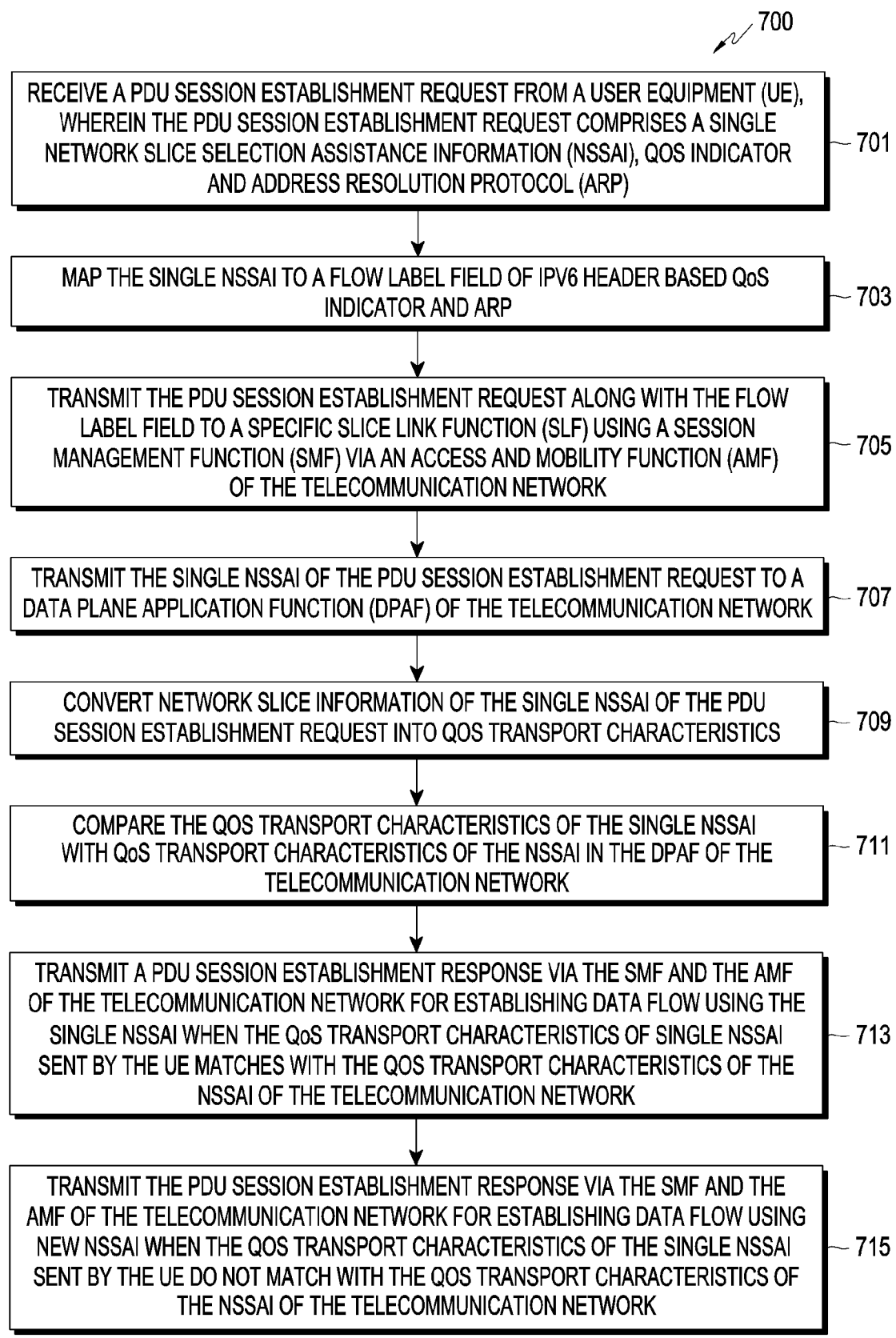
FIG. 7 illustrates a flowchart showing a method for traffic forwarding in telecommunication networks performed by a system in accordance with an embodiment.

FIG. 7 illustrates a flowchart showing a method for traffic forwarding in telecommunication networks performed by a system in accordance with some embodiments of the present disclosure.

As illustrated in the FIG. 7, the method 700 includes one or more steps for traffic forwarding in telecommunication networks. The method 700 may be described in the general context of computer executable instructions. Generally, computer executable instructions can include routines, programs, objects, components, data structures, procedures, units, and functions, which perform particular functions or implement particular abstract data types.

The order in which the method 700 is described is not intended to be construed as a limitation, and any number of the described method steps can be combined in any order to implement the method. Additionally, or alternatively, individual steps may be deleted from the methods without departing from the scope of the subject matter described herein. Furthermore, the method can be implemented in any suitable hardware, software, firmware, or combination thereof.

Referring to FIG. 7, at step 701, the BS 103 of the telecommunication network may receive a PDU session establishment request from the UE 101. The PDU session establishment request may comprise a single NSSAI, QoS indicator and ARP.

At step 703, the base station 103 of the telecommunication network may map the single NSSAI to a Flow Label field of IPv6 header based on QoS indicator and ARP.

At step 705, the base station 103 of the telecommunication network may transmit the PDU session establishment request along with the Flow Label field to the specific SLF 113 using the SMF 113 via an AMF 105 of the telecommunication network.

At step 707, the SLF 113 of the telecommunication network may transmit the single NSSAI of the PDU session establishment request to the DPAF 117 of the telecommunication network.

At step 709, the DPAF 117 of the telecommunication network may convert network slice information (i.e. the information contained in the at least one of SST and SD) of the single NSSAI of the PDU session establishment request into QoS transport characteristics.

At step 711, the DPAF 117 of the telecommunication network may compare the QoS transport characteristics of the single NSSAI with QoS transport characteristics of the NSSAI in the DPAF 117 of the telecommunication network.

At step 713, the DPAF 117 of the telecommunication network may transmit a PDU session establishment response via the SMF 113 and the AMF 105 of the telecommunication network for establishing data flow using the single NSSAI. This may happen when the QoS transport characteristics of single NSSAI sent by the UE 101 matches with the QoS transport characteristics of the NSSAI of the telecommunication network.

At step 715, the DPAF 117 of the telecommunication network may transmit the PDU session establishment response via the SMF 113 and the AMF 105 of the telecommunication network for establishing data flow using new NSSAI. This may happen when the QoS transport characteristics of the single NSSAI sent by the UE 101 do not match with the QoS transport characteristics of the NSSAI of the telecommunication network.

Figure 8A:
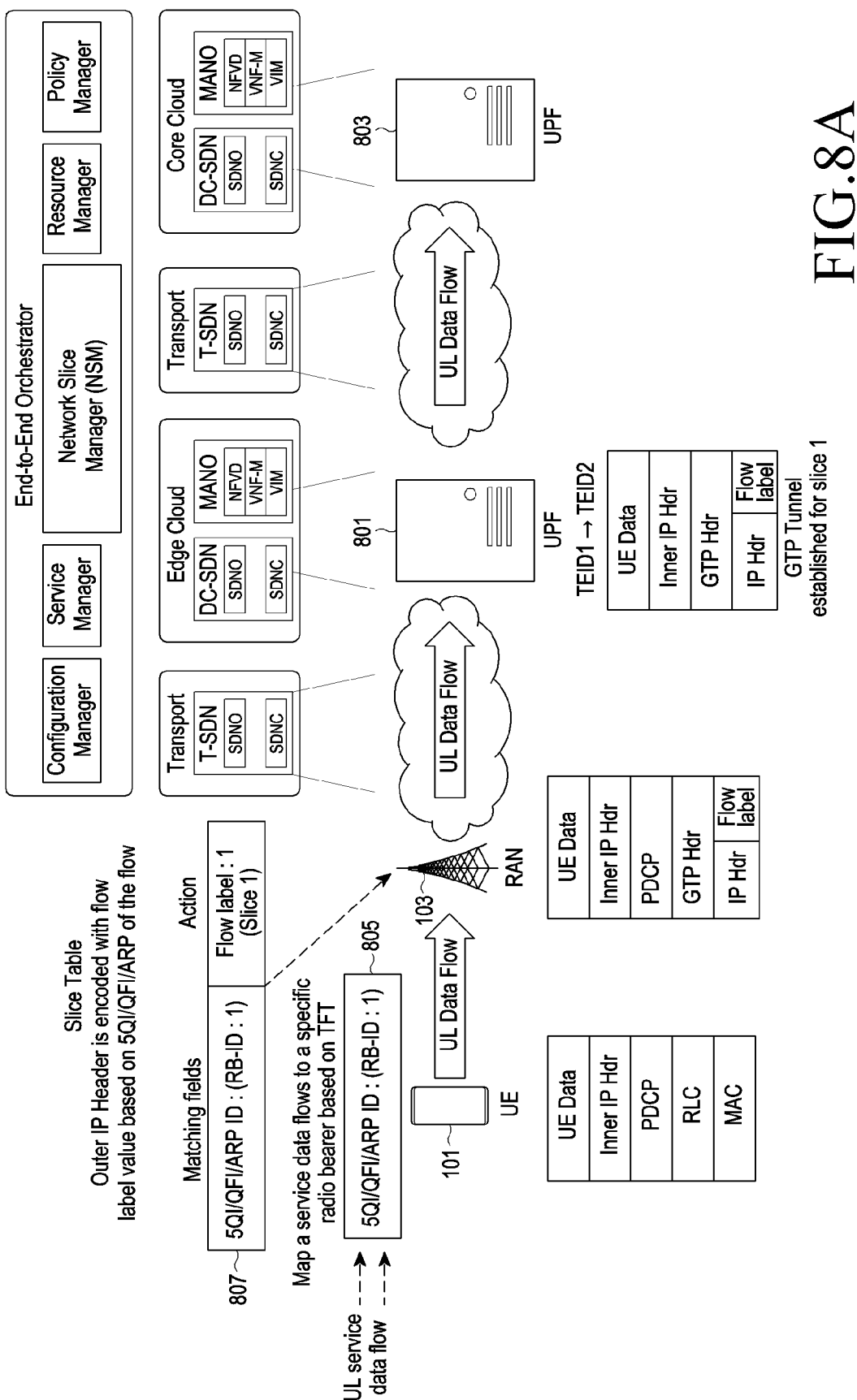
FIG. 8A illustrates an example for an uplink data flow for traffic forwarding in telecommunication networks performed by a system in accordance with an embodiment.
Figure 8B:
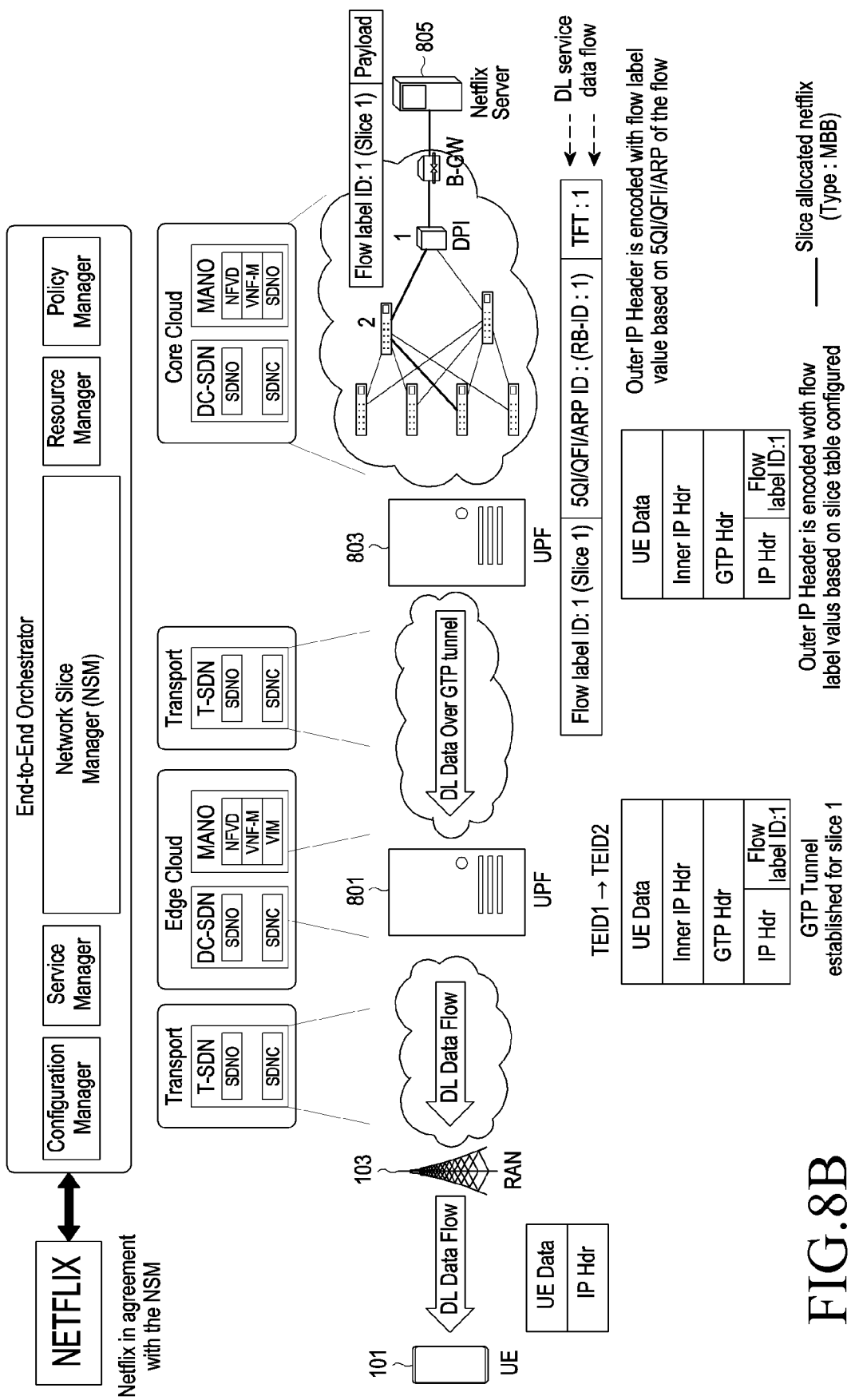
FIG. 8B illustrates an example for a downlink data flow for traffic forwarding in telecommunication networks performed by a system in accordance with an embodiment.

FIG. 8A illustrates an example for an uplink data flow for traffic forwarding in telecommunication networks performed by a system in accordance with some embodiments of the present disclosure. FIG. 8B illustrates an example for a downlink data flow for traffic forwarding in telecommunication networks performed by a system in accordance with some embodiments of the present disclosure. For explaining the example illustrated in FIGS. 8A and 8B, the telecommunication network may be a 5G network.

With reference to FIG. 8A, the UE 101 may transmit a UL PDU session establishment request to the RAN 103 (for each IP flow in a network slice). Here, the RAN may be a BS 103. The UL PDU session establishment request may comprise at least one of a single NSSAI, 5QI or QFI and ARP 805. The RAN 103 may map the single NSSAI to a Flow Label field 807 of IPv6 header based 5QI or QFI and ARP. The Flow Label field of IPv6 header is a 20 bits field that allows mapping up to $2^{20}$ (i.e. 1048576) network slices. The Flow Label field may allow mapping of packet flows to its network slice (i.e. slice ID) based on its QoS transport characteristics i.e. the Flow Label field may be used to classify and forward the (packet) traffic on its respective network slice. Based on the 5QI or QFI and ARP of the associated QoS Flow, the RAN 103 may mark the packet with the slice ID by encoding the Flow Label field 807 of the packet and forward the packet to the slice. The RAN 103 may transmit the UL PDU over GPRS tunneling protocol (GTP) tunnel towards user plane function (UPF) 801, 803. The UPF 801, 803 may further transmit the UL PDU to DPAF (not shown in FIG. 8A) via SMF/SLF (not shown in FIG. 8A). In this example, the DPAF may be present at a commercial servicer 805 i.e. Netflix server.

With reference to FIG. 8B, when a UL PDU is received from the UE 101, a commercial server 805 i.e. Netflix server may transmit requested DL PDU to the RAN 103 using the Flow Label field of IPv6 header (i.e. slice ID) via the DPAF (not shown in FIG. 8B), SMF/SLF (not shown in FIG. 8B), UPF 801, 803 over GTP tunnel. In detail, the DPAF may convert network slice information (i.e. the information contained in the at least one of SST and SD) of the single NSSAI of the UL PDU session establishment request into QoS transport characteristics such as data rate, jitter, priority and the like. At the DPAF, the QoS transport characteristics of the single NSSAI may be compared with QoS transport characteristics of the NSSAI in the DPAF. The DPAF may transmit a PDU session establishment response to the SMF/SLF for establishing data flow using the single NSSAI when the QoS transport characteristics of single NSSAI sent by the UE 101 matches with the QoS transport characteristics of the NSSAI of the telecommunication network. Alternatively, the DPAF may transmit the PDU session establishment response to the SMF/SLF for establishing data flow using new NSSAI when the QoS transport characteristics of the single NSSAI sent by the UE 101 do not match with the QoS transport characteristics of the NSSAI of the telecommunication network. From the UE 101 side, in case of the mismatch or if the slice is not available at the present moment due to resource constraint, the UE 101 may select an alternate slice using an alternate NSSAI from its list of NSSAIs that is present with the UE 101 which may satisfy the QoS requirement of the user's service request. The UE 101 has the NSSAI information of all the slices available in the telecommunication network. The PDU session establishment response may, also, referred as transport slice configuration Ack response. In one embodiment, the new NSSAI has QoS transport characteristics similar to the single NSSAI. The SMF/SLF may forward/transmit the PDU session establishment response to the RAN 103 via UPF 801, 803 over GTP tunnel. The RAN 103 may remove the Flow Label field of IPv6 header from the DL PDU and may transmit the DL PDU to the UE 101 using IP header.

Some of the advantages of the present disclosure are listed below.

The present disclosure does not require extra header, unlike packet marking techniques such as SRv6, encoding slice ID in the header field, VLAN, NSH and MPLS, consequently, resulting in lower traffic volume compared to the packet marking techniques.

Since the present disclosure does not require extra header, the method described in the present disclosure reduces packet processing delay leading to reduction in end-2-end latency.

The present disclosure overcomes forwarding compatibility issues that exist in packet marking techniques such as SRv6, MPLS, VLAN and NSH.

The present disclosure allows mapping of packet flows to its needed network slice based on its QoS transport characteristics by using 20 bits Flow Label field of IPv6 header, which allows $2^{20}$ (i.e. 1048576) network slices. This approach overcomes the limitation of DSCP field of 6 bits code point that allows only maximum $2^6$ (i.e. 64) different codes.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the present disclosure(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an", and "the" mean "one or more", unless expressly specified otherwise.

A description of an embodiment with several components in communication with each other does not imply that all such components are required. On the contrary, a variety of optional components are described to illustrate the wide variety of possible embodiments of the present disclosure.

When a single device or article is described herein, it will be readily apparent that more than one device/article (whether or not the device or article cooperate) may be used in place of a single device/article. Similarly, where more than one device or article is described herein (whether or not the device or article cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as with such functionality/features. Therefore, other embodiments of the present disclosure do not include the device itself.

The illustrated operations of FIGS. 4, 5, 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and the language may not have been selected to delineate or circumscribe the inventive subject matter. It is therefore intended that the scope of the present disclosure be limited not by this detailed description, but rather by any claims that issue on an application based here on. Accordingly, the disclosure of the embodiments of the present disclosure is intended to be illustrative, but not limiting, of the scope of the present disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents Although the present disclosure has been described with various embodiments, various changes and modifications may be suggested to one skilled in the art. It is intended that the present disclosure encompass such changes and modifications as fall within the scope of the appended claims.

What is claimed is:

1. A method for traffic forwarding in communication networks, the method comprising:
   transmitting, by a user equipment (UE), a protocol data unit (PDU) session establishment request to a communication network, wherein the PDU session establishment request comprises a single network slice selection assistance information (NSSAI), a quality of service (QoS) indicator and an address resolution protocol (ARP);
   receiving, by the UE, a PDU session establishment response from the communication network for establishing data flow using the single NSSAI in response to QoS transport characteristics associated with the single NSSAI sent by the UE matching QoS transport characteristics of an NSSAI of the communication network; and
   receiving, by the UE, the PDU session establishment response from the communication network for establishing data flow using a new NSSAI in response to the QoS transport characteristics associated with the single NSSAI sent by the UE not matching one of the QoS transport characteristics of the NSSAI of the communication network.

2. The method of claim 1, wherein the single NSSAI comprises at least one of a slice/service type (SST) and a slice differentiator (SD),
wherein the SD comprises at least one of a subslice identifier and a non-standard value.

3. The method of claim 1, wherein the NSSAI of the communication network comprises a plurality of single NSSAIs.

4. The method of claim 1, the method further comprising:
transmitting, by the UE, a registration request to the communication network, wherein the registration request comprises at least one of default configured network slice selection assistance information (DCNI) and a network slicing indication information element (IE); and
receiving, by the UE, a registration accept response from the communication network, wherein the registration accept response comprises the NSSAI of the communication network.

5. A method for traffic forwarding in communication networks, the method comprising:
receiving, by a base station of a communication network, a PDU session establishment request from a user equipment (UE), wherein the PDU session establishment request comprises a single network slice selection assistance information (NSSAI), a quality of service (QoS) indicator and an address resolution protocol (ARP);
mapping, by the base station, the single NSSAI to a flow label field of a header based on the QoS indicator and the ARP;
transmitting, by the base station, the PDU session establishment request along with the flow label field to a slice link function (SLF) using a session management function (SMF) via an access and mobility function (AMF) of the communication network;
transmitting, by the SLF, the single NSSAI of the PDU session establishment request to a data plane application function (DPAF) of the communication network;
converting, by the DPAF, network slice information of the single NSSAI of the PDU session establishment request into QoS transport characteristics;
comparing, by the DPAF, the QoS transport characteristics of the single NSSAI with QoS transport characteristics of NSSAIs in the DPAF of the communication network; and
transmitting, by the DPAF, a PDU session establishment response via the SMF and the AMF for establishing data flow using the single NSSAI in response to the QoS transport characteristics of the single NSSAI matching the QoS transport characteristics of the NSSAI in the DPAF of the communication network.

6. The method of claim 5, further comprising:
transmitting, by the DPAF, the PDU session establishment response via the SMF and the AMF for establishing data flow using a new NSSAI in response that the QoS transport characteristics of the single NSSAI not matching the QoS transport characteristics of the NSSAI in the DPAF of the communication network.

7. The method of claim 5, wherein the single NSSAI comprises at least one of a slice/service type (SST) and a slice differentiator (SD),
wherein the SD comprises at least one of a subslice identifier and a non-standard value.

8. The method of claim 5, wherein the NSSAI of the communication network comprises a plurality of single NSSAIs.

9. The method of claim 5, wherein the PDU session establishment request is transmitted by the SMF along with the flow label field to the SLF based on the flow label field.

10. The method of claim 5, the method further comprising:
receiving, by the AMF, a registration request from the UE via the base station, wherein the registration request comprises at least one of default configured network slice selection assistance information (DCNI) and a network slicing indication information element (IE);
transmitting, by the AMF, a slice discovery request to a network slice selection function (NSSF) of the communication network in response to the registration request;
receiving, by the AMF, a slice discovery response from the NSSF, wherein the slice discovery response comprises the NSSAI; and
transmitting, by the AMF, a registration accept response to the UE, wherein the registration accept response comprises the NSSAI of the communication network.

11. A user equipment (UE) for traffic forwarding in telecommunication networks, the UE comprising:
a processor; and
a memory communicatively coupled to the processor, wherein the memory stores processor-executable instructions, which on execution, cause the processor to:
transmit a protocol data unit (PDU) session establishment request to a communication network, wherein the PDU session establishment request comprises a single network slice selection assistance information (NSSAI), a quality of service (QoS) indicator and an address resolution protocol (ARP);
receive a PDU session establishment response from the telecommunication network for establishing data flow using the single NSSAI in response to QoS transport characteristics associated with the single NSSAI sent by the UE matching QoS transport characteristics of an NSSAI of the communication network; and
receive a PDU session establishment response from the telecommunication network for establishing data flow using a new NSSAI in response to the QoS transport characteristics associated with the single NSSAI sent by the UE not matching the QoS transport characteristics of the NSSAI of the communication network.

12. The UE of claim 11, wherein the single NSSAI comprises at least one of a slice/service type (SST) and a slice differentiator (SD),
wherein the SD comprises at least one of a subslice identifier and a non-standard value.

13. The UE of claim 11, wherein the NSSAI comprises a plurality of single NSSAIs.

14. The UE of claim 11, wherein the UE causes the processor to:
transmit a registration request to the communication network, wherein the registration request comprises at least one of default configured network slice selection assistance information (DCNI) and a network slicing indication information element (IE); and
receive a registration accept response from the communication network, wherein the registration accept response comprises the NSSAI.

15. A system for traffic forwarding in communication networks, the system comprising:
a base station configured to:
receive a PDU session establishment request from a user equipment (UE), wherein the PDU session establishment request comprises a single network slice selection assistance information (NSSAI), a quality of service (QoS) indicator and an address resolution protocol (ARP);
map the single NSSAI to a flow label field of a header based on the QoS indicator and the ARP;
transmit the PDU session establishment request along with the flow label field to a slice link function (SLF) using a session management function (SMF) via an access and mobility function (AMF) of the communication network;
the SLF configured to:
transmit the single NSSAI of the PDU session establishment request to a data plane application function (DPAF) of the communication network;
the DPAF configured to:
convert network slice information of the single NSSAI of the PDU session establishment request into QoS transport characteristics;
compare the QoS transport characteristics of the single NSSAI with QoS transport characteristics of NSSAI in the DPAF of the communication network; and
transmit a PDU session establishment response via the SMF and the AMF for establishing data flow using the single NSSAI in response to the QoS transport characteristics of the single NSSAI matching the QoS transport characteristics of the NSSAI in the DPAF of the communication network.

16. The system of claim 15, wherein the DPAF is further configured to:
transmit the PDU session establishment response via the SMF and the AMF for establishing data flow using new NSSAI in response to the QoS transport characteristics of the single NSSAI not matching the QoS transport characteristics of the NSSAI in the DPAF of the communication network.

17. The system of claim 15, wherein the single NSSAI comprises at least one of a slice/service type (SST) and a slice differentiator (SD),
wherein the SD comprises at least one of a subslice identifier and a non-standard value.

18. The system of claim 15, wherein the NSSAI comprises a plurality of single NSSAIs.

19. The system of claim 15, wherein the SMF transmits the PDU session establishment request along with the flow label field to the SLF based on the flow label field.

20. The system of claim 15, the system further comprising:
the AMF configured to:
receive a registration request from the UE via the base station, wherein the registration request comprises at least one of default configured network slice selection assistance information (DCNI) and a network slicing indication information element (IE);
transmit a slice discovery request to a network slice selection function (NSSF) of the communication network in response to the registration request;
receive a slice discovery response from the NSSF, wherein the slice discovery response comprises the NSSAI; and
transmit a registration accept response to the UE, wherein the registration accept response comprises the NSSAI.

* * * * *